Figure 1:
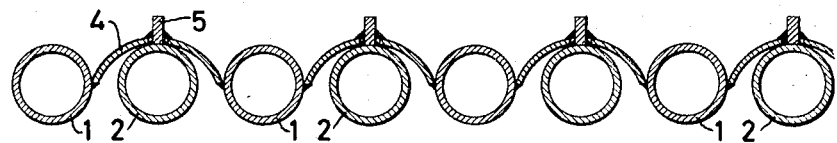

March 28, 1967 V. KOLLERUP 3,311,091
TUBE WALL FOR FLUID HEATING DEVICES, AND A METHOD
OF PRODUCING SUCH TUBE WALL
Filed Jan. 10, 1966 2 Sheets-Sheet 1

INVENTOR

Vagn Kollerup

BY Stevens, Davis, Miller & Mosher

ATTORNEYS

INVENTOR
Vagn Kollerup
ATTORNEYS

United States Patent Office 3,311,091
Patented Mar. 28, 1967

3,311,091
TUBE WALL FOR FLUID HEATING DEVICES, AND A METHOD OF PRODUCING SUCH TUBE WALL
Vagn Kollerup, Copenhagen, Denmark, assignor to Aktieselskabet Burmeister & Wain's Maskin-OG Skibsbyggeri, Copenhagen, Denmark, a company of Denmark
Filed Jan. 10, 1966, Ser. No. 519,653
Claims priority, application Denmark, Jan. 13, 1965, 172/65
4 Claims. (Cl. 122—6)

This invention relates to a tube wall for fluid heating devices, such as tubulous vapour generators, comprising a plurality of parallel tubes extending substantially in a common plane, which tubes are connected by welding to form a gas-tight wall. It will be appreciated that the invention can also be employed in connection with tube wall sections or panels which may be manufactured in a work shop and later assembled to form a complete tube wall, e.g. of a tubulous boiler.

Tube walls of the kind referred to are known, in which adjacent tubes are connected either directly by welding seams or by means of axially extending fins welded to the tubes so as to form a gas-tight wall. It is also known to form such a wall of tubes provided with projecting fins which are welded together.

When it is desired to obtain complete or substantially complete coverage of the walls in a tubulous boiler, the tubes of the wall must be closely spaced, and in this case it is difficult to carry out the assembly welding of tube wall sections or panels forming together a complete tube wall. Due to the close spacing of the tubes it is impossible to weld adjacent tubes or tube ends together without deforming the tubes in such a way that they are temporarily pulled out of the plane of the tube wall. Similar difficulties occur when a damaged tube or tube section in a tube wall is to be replaced. A further inconvenience of the tube walls wherein the tubes are welded together either directly or via projecting fins, resides in the relatively great rigidity or stiffness of the tube wall which may give rise to considerable stresses in the structural materials in case of temperature differences between adjacent tubes. This inconvenience is particularly pronounced in forced flow boilers. In high tubulous wall having horizontally or substantially horizontally extending tubes, the stiffness or rigidity of the wall has the further inconvenience that the tube wall must be divided into tube groups which are suspended individually in supporting structures comprising resilient links associated with the individual groups of tubes.

According to the present invention there is provided a tube wall for fluid heating devices, such as tubulous vapour generators, comprising a first group of parallel tubes extending substantially in a common plane, a plurality of plate members extending in the longitudinal direction of said tubes, each of said plate members having a curvilinear cross-section and being welded to two adjacent tubes of said first tube group at the free longitudinal edges of said plate member, a second group of tubes extending substantially in the said plane of the first tube group and parallel to the tubes of said first group, at least one tube of said second group being disposed between each two adjacent tubes of said first group, and means whereby each tube of said second group is gastight connected to the plate member welded to the two tubes of said first group between which said second tube is disposed.

The invention provides the advantage of a substantially more resilient wall than prior art walls in which adjacent tubes are directly welded together, as the distance between two adjacent tubes connected by way of the plate members is larger, so that a better stress equalization is obtained in case of temperature differences between the mutually connected tubes. The tubes belonging to the second group of tubes act to screen the plate members against direct radiations from the furnace whereby the thermal load on the plate members is reduced. The invention further provides the advantage that the assembly welding operation, at which tube wall sections or panels ar connected together, can be carried out more readily and without deforming or bending the tubes to be connected, due to the relative large spacing between such tubes in the transverse direction. The repair or exchange of defect tubes is also facilitated because the plate members can be cut through from the outer side of the wall without involving any risk of damaging the other tubes not involved.

The increased resiliency of the tube wall makes is possible to suspend even high, fully welded vertical walls composed of horizontally extending tubes in simple, vertical tension members which are welded to selected plate members spaced apart in the vertical direction. Temperature differences, which occur inter alia in connection with the initial heating of the boiler, between the tubes and the tension members, and the different dilations resulting therefrom can be accommodated without any risk of excessive stresses in the welding seams, as the wall portions between the points of connection to the tension members are capable of substantial resilient deformations.

According to a feature of the invention, each tube of said second group may be provided with axially spaced bearing tabs projecting through corresponding longitudinal slots in the plate members, Thus, the intermediate tubes of the second group are not connected to the plate members in their entire length, so that the total amount of welding necessary for constructing a tube wall or wall panel is reduced.

According to a further feature of the invention the tabs may be welded to the plate members on the side of each member remote from the tubes. In this case the intermediate tubes of the second group can easily be removed after grinding away the welding seams which are accessible from the outer side of the wall.

Alternatively, the axial length of the slots in the plate members may exceed the axial length of the tabs, and stop means for limiting the transverse mobility of said tabs may be secured to the part of each tab projecting through the associated slot, while a gas-tight cover may be secured to each plate member to cover the slots and projecting tabs. This provides for a certain mobility of the intermediate tubes in the axial direction thereof, whereby undesirable stresses may be further reduced.

Figure 2:
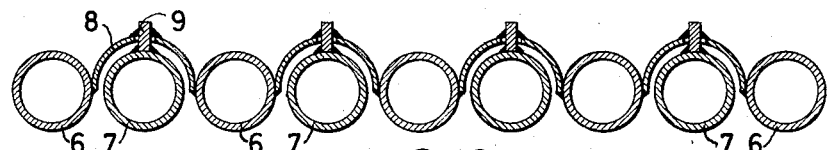
Figure 3:
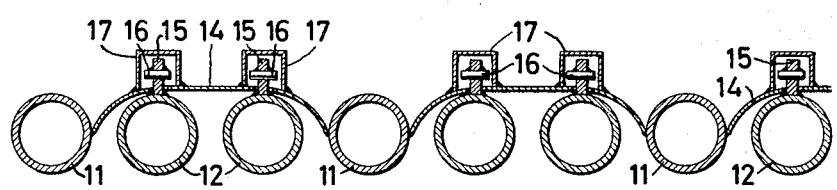
Figure 4:
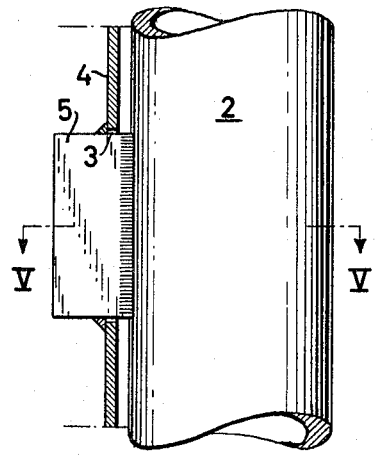
Figure 6:
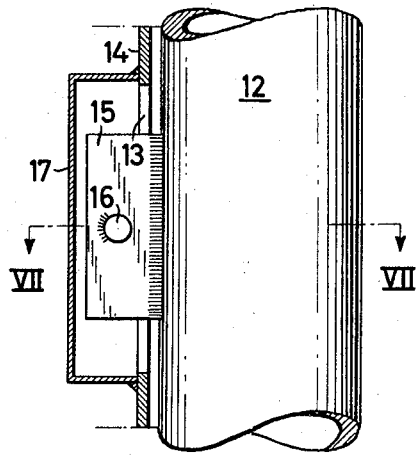
Figure 5:
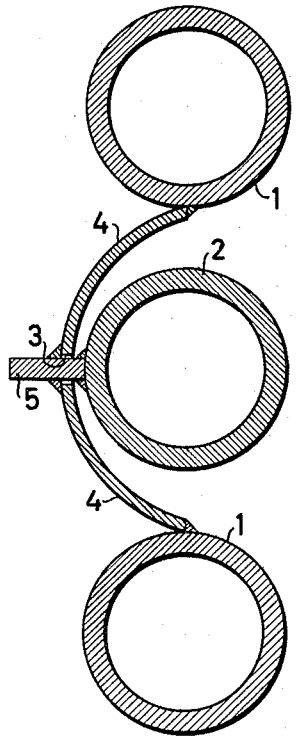
Figure 7:
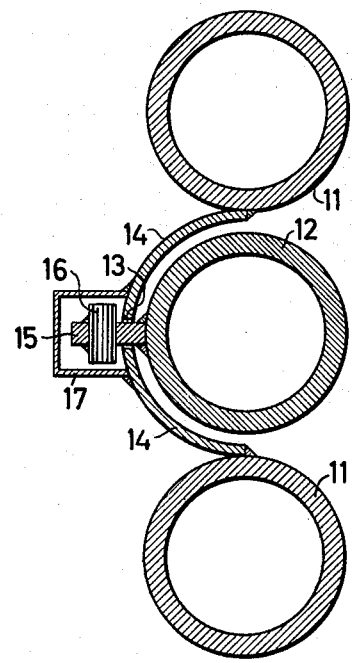

The invention will now be described by way of example with reference to the accompanying drawings in which:

FIG. 1 is a section between a portion of a tubulous wall embodying the present invention, FIG. 2 is a corresponding section through a slightly modified embodiment, FIG. 3 is a section through a third embodiment of the invention, FIG. 4 is an axial, part-sectional view to a larger scale of a single tube and a plate member of the wall shown in FIG. 1, FIG. 5 is a section along line V—V of FIG. 4, FIG. 6 is a section corresponding of FIG. 4, through a fourth embodiment of the invention, and FIG. 7 is a section on the line VII—VII of FIG. 6.

The tube wall illustrated in FIGS. 1, 4 and 5 comprises a plurality of parallel tubes designated alternately by 1 and 2. The tubes 1 and 2 are identical as concerns their dimension, but differ in the way in which they are arranged in the complete wall structure. Two adjacent tubes 1, between which a tube 2 is disposed, are connected together by means of a plate member 4 the cross-section of which is curvilinear as shown in FIGS. 1 and 5, and which is welded to the two tubes 1 in question along the free longitudinal edges thereof.

The plate member 4 is curved away from the inner side of the tube wall 1, 2 which may form a boundary surface of the radiation furnace of a tubular vapour generator or boiler. Centrally of each plate member 4 there are provided a plurality of slots 3 spaced longitudinally of the member, and a bearing tab 5 which at its inner edge is welded to a tube 2, projects through each slot 3. As shown, the bearing tab 5 is welded to the plate member 4 on the outer side thereof.

A wall panel as described possesses a substantial resiliency, due to the relatively great spacing between successive or adjacent tubes 1 connected by way of the curved plate members 4, and the way in which the intermediate tube 2 of the second tube group is secured to the plate members. The spacing between the tubes 1 also facilitates the assembly of a complete tube wall by joining together of shop made sections or panels, when the adjoining outer tubes 1 are connected by means of a plate member 4 during the assembly, before the intermediate tubes 2 of the second tube group are secured to the plate members. The arrangement also facilitates the welding operation for connecting two wall panels in axial alignment by butt welding of adjoining ends of the tubes 1 and 2, respectively. It will also be appreciated that a repair comprising replacement of a damaged tube can be easily carried out, because there is ample room on the outer side of the wall for cutting through two adjacent plate members 4 in order to replace a tube 1, while a tube 2 can be replaced after grinding away the welding seams between the tabs 5 and the associated plate member 4, in both cases without any substantial risk of damaging adjacent tubes.

The embodiment illustrated in FIG. 2 corresponds substantially to that of FIG. 1 with the difference that the tubes of the first and second group, 6 and 7, respectively, are closer spaced as in FIG. 1. Correspondingly the plate members 8 which connect the tubes 6 pairwise, have a smaller radius of curvature in the horizontal section. The bearing tabs 9 welded to the tubes 7 are also in this case extended through slots in the plate members 8 and welded to the outer face of these members. As in FIG. 1, there is only shown one slot in each plate member, but it will be appreciated that there are a plurality of such slots arranged at a suitable spacing in the axial direction of the tubes.

The embodiment of FIG. 3 differs from those of FIGS. 1 and 2 by the number of tubes in the second tube group. In FIG. 3 there are disposed two tubes 12 of the second group between each pair of adjacent tubes 11 of the first group. The plate members 14 connecting successive tubes 11 of the first group, have a corresponding greater width and hence a greater resiliency. The tubes 12 are not welded to the plate members 14 but are movable longitudinally with respect to the plate members which are seen in more detail in FIGS. 6 and 7. The embodiment shown in the last mentioned figures differs from that of FIG. 3 by comprising only one intermediate tube 12 between each pair of successive tubes 11 of the first tube group.

To each tube 12 there are welded a suitable number of bearing tabs 15 spaced over the length of the tube, and one such bearing tab 15 is shown in FIGS. 6 and 7. The tab 15 projects rearwardly from the tube 12 through a slot 13 in the plate element 14 connecting the pair of tubes 11 between which the tube or tubes 12 are located. The axial length of the slot 13 exceeds the length of the tab 15 which therefore together with the tube 12 has a limited mobility in the longitudinal direction with respect to the plate member 14 and the tubes 11 connected thereto. The mobility of the tube 12 transversely of the tube wall is limited by means of a stop pin 16 extending transversely through a bore in the tab 15 on the outer side of the plate member 14 and welded to the tab 15. In order to ensure the gas-tight properties of the wall there is welded a cap 17 of sheet material to the outer side of the plate member 14 around the slot 13 to close the same towards the surroundings.

The embodiments of the invention shown and described herein are only intended as examples for illustrating the invention, and they may be modified in several ways within the scope of the invention. The tube wall or wall panel of the invention may be constructed with tubes extending substantially in vertical or horizontal direction, in the latter case as a helically wound tube wall in which the individual tubes of joined panels or sections extend in helix form around a boiler furnace. Such a tubulous wall can be suspended in vertical tension bars or similar construction members which are welded directly to the rear side of the plate members at suitably spaced locations, e.g. to each fifth or tenth plate member. Between the welding connections the wall portions consisting of tubes and curvilinear plate members are sufficiently resilient for accommodating even considerable temperature differences between the tubes and the supporting means. The tubes of the first and second group, respectively, may have different dimensions and may also carry fluid at different temperatures. Specially in case of walls comprising vertical tubes, the first group may consist of vapour generating tubes while the other group consists of superheater or reheater tubes.

I claim:

1. A tube wall adapted to form a boundary wall of a furnace chamber in a tubulous vapor generator, comprising a plurality of parallel tubes all extendnig in a common plane and exposed to heat from said furnace chamber, said heated tubes consisting of a first group of tubes and a plurality of secondary tube groups each located between two successive tubes of said first tube group and comprising at least one tube, a plurality of plate members extending in the longitudinal direction of said parallel tubes, each of said plate members being disposed behind the tubes of the secondary tube group located between two successive tubes of said first tube group as viewed from the furnace chamber, said plate members having a concave curvilinear cross-section as viewed from the furnace chamber and being welded to two successive tubes of said first tube group at the free longitudinal edges of said plate member, and connecting means effecting a gas-tight connection between each tube of said secondary group and the associated plate member.

2. The tube wall as claimed in claim 1, wherein said connecting means comprises axially spaced bearing tabs on each tube of said second group and longitudinal slots in said plate members, said tabs projecting through said slots.

3. A tube wall as claimed in claim 2, wherein said tabs are welded to said plate members on the side of each member remote from the tubes.

4. A tube wall as claimed in claim 2, wherein the axial length of said slots exceeds the axial length of said tabs, the wall further comprising stop means for limiting the transverse mobility of said tabs secured to the part of each tab projecting through the associated slot, and a gas-tight cover secured to each plate member to cover said slot and projecting tab.

References Cited by the Examiner

UNITED STATES PATENTS 1,774,136  8/1930  Forssblad _____ 122—235
1,774,150  8/1930  Murray _____ 122—6

FOREIGN PATENTS 887,508  1/1962  Great Britain.

KENNETH W. SPRAGUE, *Primary Examiner.*